United States Patent Office 2,897,167
Patented July 28, 1959

2,897,167

PROCESS FOR POLYMERIZING MONOMERIC MATERIALS COMPRISING CONJUGATED DIOLEFINS AND METHYL ISOPROPENYL KETONE

Robert R. Dreisbach and George B. Sterling, Midland, Mich., assignors to The Dow Chemical Company, Midland, Mich., a corporation of Delaware No Drawing. Application March 5, 1956
Serial No. 569,247

13 Claims. (Cl. 260—23)

This invention concerns an improved process for polymerizing unsaturated organic compounds comprising conjugated diolefins and methyl isopropenyl ketone while dispersed in an aqueous emulsion. It relates more particularly to a process for effecting the polymerization of a monomeric material comprising a conjugated diolefin and methyl isopropenyl ketone in an aqueous emulsion to produce a rubber-like copolymer in the form of a synthetic latex without the occurrence of precoagulated polymer.

Polymerization in aqueous emulsion has long been recognized as a particularly advantageous method to produce synthetic rubber or a synthetic rubber latex. Recipes of the redox type, i.e. formulations wherein both oxidizing and reducing components are present, have been widely used, and a number of recipes have been developed especially for use in low temperature emulsion polymerization.

However, in processes for the polymerization of a monomeric material comprising conjugated diolefins in an aqueous emulsion to produce a synthetic rubber or a synthetic rubber latex, it has usually been necessary to terminate the polymerization short of completion, e.g. at from 60 to 70 percent completion, since otherwise an appreciable amount of polymer is formed as gels cross-linked to insolubility, thereby forming a rubber of inferior quality, i.e. a rubber having a high gel content, or a considerable amount of polymer is formed as precoagulated material. In most instances the occurrence of both polymer having a high gel content and particles of the precoagulated polymer in the latex are obtained when the polymerization is continued until all or nearly all of the monomeric material is polymerized.

The occurrence of precoagulated polymer in emulsion polymerization for the production of a rubbery or a synthetic rubber latex is disadvantageous and is particularly troublesome in a process for carrying out the polymerization in continuous manner. When the polymerization is terminated short of completion extra steps are required for separating the unconsumed monomer from the latex.

It has now been found that the polymerization of a monomeric material comprising at least 40 percent by weight of at least one conjugated diolefin selected from the group consisting of butadiene-1,3 and isoprene, and at least 5, preferably from 10 to 50 percent by weight or more of methyl isopropenyl ketone can readily be carried out at temperatures between 1° and 10° C. until complete or substantially complete while having the monomeric material dispersed in a neutral to alkaline emulsion comprising an aqueous phase consisting of water containing an emulsifying agent and an oxidant-reductant catalyst composition effective to polymerize the monomeric material to produce a rubber-like polymer in the form of a synthetic latex which is free or substantially free from precoagulated polymer.

It has further been found that a neutral to alkaline emulsion comprising a monomeric material consisting of at least 40 percent by weight of butadiene or isoprene and at least 5, preferably 10, percent or more of methyl isopropenyl ketone dispersed in an aqueous phase comprising an emulsifying agent and an oxidant-reductant catalyst composition can readily be converted to a synthetic latex containing a rubber or rubber-like polymer without the occurrence of precoagulation by polymerizing the monomeric material at temperatures between 1° and 10° C. while having the emulsion in contact with surfaces of metals such as iron, ordinary carbon steel or alloys of steel, e.g. stainless steel.

It is important that the monomeric material to be polymerized comprises a mixture of polymerizable ingredients consisting of at least 5, preferably from 10 to 50, percent by weight of methyl isopropenyl ketone and at least 40 percent by weight of butadiene-1,3 or isoprene. The methyl isopropenyl ketone has an effect of preventing or curtailing the occurrence of precoagulated polymer.

Suitable monomeric materials are mixtures of from 40 to 80 percent by weight of at least one conjugated diolefin selected from the group consisting of butadiene-1,3 and isoprene, and from 60 to 20 percent of at least one monoethylenically unsaturated organic compound selected from the group consisting of methyl isopropenyl ketone and mixtures of methyl isopropenyl ketone and at least one vinylidene compound which is a member of the group consisting of vinylidene chloride, acrylonitrile, lower alkyl vinyl ethers, lower alkyl esters of acrylic acid and monovinyl aromatic compounds selected from the group consisting of monovinyl aromatic hydrocarbons of the benzene series and nuclear halogenated derivatives thereof, said monomeric material containing at least 5, preferably from 10 to 50, percent by weight of methyl isopropenyl ketone, based on the sum of the weights of the polymerizable ingredients.

Examples of suitable monovinyl aromatic compounds are styrene, vinyltoluene, vinylxylene, ethylstyrene, isopropylstyrene, ethylchlorostyrene, chlorostyrene, dichlorostyrene, ethylvinyltoluene, diethylstyrene, trichlorostyrene, bromostyrene, fluorostyrene, etc. Examples of lower alkyl esters of acrylic acid are methyl acrylate, ethyl acrylate, propyl acrylate and butyl acrylate. Examples of lower alkyl vinyl ethers are methyl vinyl ether, ethyl vinyl ether, propyl vinyl ether or butyl vinyl ether.

The monomeric material is preferably a mixture of polymerizable ingredients comprising essentially from 40 to 80 percent by weight of butadiene-1,3 or isoprene, from 10 to 50 percent of methyl isopropenyl ketone and from 10 to 40 percent of one or more other vinylidene compounds e.g. acrylonitrile or a monovinyl aromatic compound such as styrene, vinyltoluene or dichlorostyrene, based on a total of 100 parts by weight of the polymerizable ingredients.

Emulsifying agents which are applicable in the polymerization are those of the anionic type, especially anionic emulsifying agents which are stable or effective in neutral to alkaline aqueous solutions having a pH value between 7 and 12. A large number of such emulsifying agents are known. Suitable anionic emulsifying agents are materials such as the sodium or potassium salts of fatty acids derived from tall oil, alkali metal salts of sulfated aliphatic alcohols containing at least 12 carbon atoms in the molecule such as sodium lauryl sulfate or sodium and potassium salts of disproportionated rosin acid or potassium salts of 50/50 mixtures of disproportionated rosin acid and fatty acids derived from tall oil. Mixtures of any two or more of the anionic emulsifying agents can be used.

It is important that the polymerization of the monomeric material is carried out at lower than ordinary temperatures, i.e. at temperatures between 1° and 10° C., and in a neutral to alkaline aqueous emulsion comprising a formulation wherein both oxidizing and reducing components are present, e.g. a redox type recipe. Carrying out of the polymerization at 0° or lower, requires the use of an alcohol to prevent freezing, and temperatures higher than about 10° C. tend to promote the formation of precoagulated polymer.

The amount of the emulsifier used will vary somewhat depending in part upon the relative amounts of monomeric material and aqueous phase. The monomeric material may be employed in amount corresponding to from 10 to 100 parts by weight per 100 parts of the aqueous phase. The emulsifying agent is usually employed in amount corresponding to from 0.5 to 10 parts by weight per 100 parts of the monomeric material.

The pH value of the emulsion is maintained between 7 and 12, preferably from 8 to 11. Best results are usually obtained when carrying out the polymerization in an aqueous emulsion having a pH value between 8.5 and 10.5. The pH value of the aqueous emulsion is preferably adjusted to a desired value by adding an alkali metal hydroxide such as an aqueous 10 weight percent solution of sodium hydroxide or potassium hydroxide, thereto.

It is desirable to include an electrolyte such as potassium chloride, trisodium phosphate or other salt which will not produce deleterious effects in the system. The salt, suitably KCl has an effect of increasing the fluidity of the latex. Such salt is employed in amount not greater than about one part per 100 parts of monomer.

The oxidant-reductant catalyst composition to be employed in the process comprises iron in a condition such that the iron can change its valence state reversibly, and a reductant. The iron is usually added as ferrous sulfate or ferric chloride which iron can readily pass from a low valence to a high valence and vice versa. The reductant is usually an easily oxidizable organic compound such as glucose, levulose, sorbose, invert sugar or sodium sulfoxylate formaldehyde. The reductant is preferably sodium sulfoxylate formaldehyde. The oxidant to be employed in the process is preferably an organic hydroperoxide such as cumene hydroperoxide, diisopropylbenzene hydroperoxide, or p-menthane hydroperoxide. Satisfactory results have been obtained employing an oxidant-reductant catalyst composition comprising ferric chloride as the iron in its higher valence state, sodium sulfoxylate formaldehyde ($NaHSO_2 \cdot CH_2O \cdot 2H_2O$) as the reductant, diisopropylbenzene hydroperoxide as the oxidant and a sequestering agent such as Versene (ethylenediamine tetracetic acid sodium salt), which latter has an action of retaining the ferrous ion in soluble or sequestered condition. It is often advantageous to employ tertiary mercaptans such as a mixture of aliphatic $C_{12}$ to $C_{16}$ tertiary mercaptans in the polymerization. The tertiary mercaptans have an action of exerting a controllable degree of modification throughout the course of the polymerization, but the employment of tertiary mercaptans in the polymerization is not required.

The polymerization can be carried out batchwise or in continuous manner and in usual reaction vessels such as enamel-lined pressure resistant steel vessels. One of the advantages of the process is that the polymerization can be carried out while having all or a part of the emulsion in contact with surfaces of a ferrous metal such as iron, ordinary carbon steel or alloy steels, e.g. stainless steel. The polymerization can be continued until all of substantially all of the monomeric material is polymerized without appreciable formation of precoagulated polymer.

In effecting polymerization of the monomeric material in a batchwise operation, a suitable pressure resistant vessel is charged with the aqueous medium which contains the emulsifying agent, together with other materials such as potassium chloride and potassium hydroxide in the desired proportions, and the monomeric material is then added. At the same time a reaction modifier such as a mercaptan is added, if desired, usually as a solution in at least a part of the monomeric material.

The mixture is agitated to effect emulsification. An oxidant-reductant catalyst composition is added to the mixture and the reaction proceeds. A preferred manner of forming the emulsion is to charge the vessel with the aqueous medium containing the emulsifying agent and the catalyst composition in the desired proportions and thereafter add the monomeric material.

In a continuous system the polymerization can be carried out by feeding separate streams of the aqueous medium which contains the emulsifying agent, together with other materials such as potassium chloride and potassium hydroxide and the oxidant-reductant catalyst composition, and the monomeric material, together with a mercaptan modifier, if desired, into admixture with one another in a reaction zone, e.g. a tubular coil or other pressure resistant vessel, wherein the mixture of materials is agitated, emulsified and polymerized at temperatures between 1° and 10° C. and under a pressure at least as great as the autogenous pressure of the materials and continuously withdrawing the copolymer in the form of a synthetic latex from said reaction zone in usual ways, e.g. by means of a suitable pressure release valve.

The following examples illustrate ways in which the principle of the invention has been applied, but are not to be construed as limiting its scope.

*Example 1*

The following recipe was employed for the preparation of a methyl isopropenyl ketone-styrene-butadiene copolymer synthetic rubber latex:

| | Parts by weight |
|---|---|
| Methyl isopropenyl ketone | 10 |
| Styrene | 20 |
| Butadiene-1,3 | 70 |
| Water | 200 |
| Dresinate 214 (potassium salt of disproportionated rosin acid) | 7.2 |
| Sodium sulfoxylate formaldehyde | 0.2 |
| Versene (sodium salt of ethylenediamine tetracetic acid) | 0.4 |
| Sulfole mercaptan (tert-$C_{12}$SH 60 parts, tert-$C_{14}$SH 20 parts, and tert-$C_{16}$SH 20 parts) | 0.5 |
| Diisopropylbenzene hydroperoxide | 0.62 |
| KCl | 0.3 |
| KOH | 0.2 |
| $FeCl_3 \cdot 6H_2O$ | 0.2 |

The mixture was placed in a closed reaction vessel comprising a ¼-inch diameter standard wrought iron pipe coil connected to an iron gear pump to form a continuous passageway. The pipe coil was immersed in a water bath maintained at a temperature of 5° C. The mixture was emulsified and continuously circulated through the coil by means of the gear pump for a period of 5 hours. Thereafter, the latex was withdrawn from the coil and was filtered. The conversion was determined by complete coagulation of the latex. The conversion was 99 percent based on the monomeric starting material. No precoagulated polymer was obtained.

For purpose of comparison, a polymerization run was made employing 30 parts by weight of styrene and 70 parts of butadiene-1,3 in a recipe and by a procedure as described above. The precoagulated polymer was 8 percent by weight of the monomers initially used. The conversion, including the precoagulated polymer was 100 percent.

*Example 2*

A polymerization run was made employing monomers in proportions corresponding to 45 parts by weight of methyl isopropenyl ketone and 55 parts of butadiene-1,3 in a recipe and by a procedure similar to those given in Example 1. The product was a synthetic rubber latex. The conversion was 100 percent based on the monomers initially used. No precoagulated polymer was obtained.

Example 3

A polymerization run was made employing 45 parts by weight of methyl isopropenyl ketone, 15 parts of styrene and 40 parts of butadiene in a recipe similar to that given in Example 1, and by a procedure as described therein. The conversion was 68 percent. No insoluble precoagulated polymer was obtained.

Example 4

A polymerization run was made employing 15 parts by weight of methyl isopropenyl ketone, 30 parts of vinyltoluene and 55 parts of butadiene in a recipe and by a procedure similar to those described in Example 1. The conversion was 90 percent. No precoagulated polymer was obtained.

Example 5

A polymerization run was made employing 10 parts by weight of methyl isopropenyl ketone, 25 parts of acrylonitrile and 65 parts of butadiene in a recipe and procedure similar to those described in Example 1. The conversion was 99 percent. No precoagulated polymer was obtained.

Example 6

A polymerization run was made employing 20 parts by weight of methyl isopropenyl ketone, 20 parts of acrylonitrile and 60 parts of butadiene-1,3 in a recipe and by a procedure similar to that given in Example 1, except that the polymerization was carried out at a temperature of 10° C. for a period of 6 hours. Conversion of the monomers to polymers was quantitative. No precoagulated polymer was obtained.

Example 7

A polymerization run was made employing 5 parts by weight of methyl isopropenyl ketone, 30 parts of acrylonitrile and 65 parts of butadiene in a recipe and procedure similar to those described in Example 1. The conversion was 86.3 percent. There was obtained only 0.2 percent of precoagulated polymer based on the monomers initially used.

Example 8

A polymerization run was made employing 30 parts by weight of methyl isopropenyl ketone, 20 parts of acrylonitrile and 50 parts of isoprene in a recipe and procedure similar to those described in Example 1. The conversion was 100 percent. No precoagulated polymer was obtained.

Example 9

A polymerization run was made employing 30 parts by weight of methyl isopropenyl ketone, 20 parts of ethyl vinyl ether and 50 parts of butadiene in a recipe and procedure similar to those described in Example 1. The conversion was 96.2 percent. Only 0.2 percent of precoagulated polymer was obtained based on the monomers initially used.

Example 10

A polymerization run was made employing 5 parts by weight of methyl isopropenyl ketone, 25 parts of styrene, and 70 parts of butadiene in a recipe and procedure similar to those employed in Example 1. The conversion was 98 percent. There was obtained 0.2 percent of precoagulated polymer based on the monomers initially used.

Example 11

The following recipe was employed for the production of a methyl isopropenyl ketone-acrylonitrile-butadiene-1,3 latex:

| | Parts by weight |
|---|---|
| Methyl isopropenyl ketone | 20 |
| Acrylonitrile | 20 |
| Butadiene-1,3 | 60 |
| Water | 150 |
| Dresinate 214 | 4 |
| Sodium sulfoxylate formaldehyde | 0.3 |
| Versene | 0.2 |
| Sulfole mercaptan | 0.5 |
| Diisopropylbenzene hydroperoxide | 0.31 |
| KCl | 0.3 |
| KOH | 0.15 |
| $FeCl_3 \cdot 6H_2O$ | 0.1 |

A charge of 10,000 grams of water was placed in a jacketed 5 gallon stainless steel pressure resistant vessel equipped with an anchor type stirrer. Twenty grams of KCl, 10 grams of KOH and 335 grams of Dresinate 214 (potassium salt of disproportionated rosin acid) were added. A mixture of 1450 grams of methyl isopropenyl ketone of 94 percent purity, 1360 grams of acrylonitrile and 34 grams of Sulfole mercaptan (a mixture of tert.-$C_{12}SH$ 60 parts; tert.-$C_{14}SH$ 20 parts; and tert.-$C_{16}SH$ 20 parts) was cooled to about −40° C. and added to the aqueous solution in the vessel at a temperature of about 5° C. without stirring. Thereafter, an aqueous solution of 6.8 grams of $FeCl_3 \cdot 6H_2O$, 13.6 grams of Versene (ethylenediamine tetracetic acid sodium salt) and 20.4 grams of sodium sulfoxylate formaldehyde, $$NaSO_2 \cdot CH_2O \cdot 2H_2O$$

was added followed by 40.8 grams of diisopropylbenzene hydroperoxide solution (52%). A charge of 4,080 grams of butadiene-1,3 was cooled to about −40° C. and added to the mixture, after which the vessel was quickly closed. The resulting mixture was stirred and was maintained at a temperature of about 5° C. over a period of 7 hours, after which the polymerization was substantially complete as observed by a drop in pressure within the vessel. The vessel was opened and its contents removed. The product was a synthetic latex free from precoagulated polymer. A portion of the latex was coagulated to determine the conversion. The conversion was 91.0 percent based on the monomeric material initially used.

Example 12

The following recipe was employed for the preparation of a synthetic rubber latex.

| | Parts by weight |
|---|---|
| Methyl isopropenyl ketone | 30 |
| Para-bromostyrene | 10 |
| Butadiene-1,3 | 60 |
| Water | 150 |
| Dresinate 214 | 4 |
| Sodium sulfoxylate formaldehyde | 0.3 |
| Versene | 0.14 |
| Diisopropylbenzene hydroperoxide | 0.31 |
| KCl | 0.3 |
| KOH | 0.15 |
| $FeCl_3 \cdot 6H_2O$ | 0.07 |

The ingredients were sealed in a pressure resistant glass bottle. The materials were agitated and maintained at a temperature of 5° C. for a period of 4.5 hours. Thereafter, the latex was removed. It was free from precoagulated polymer. The conversion was 100 percent.

Example 13

A synthetic rubber latex was prepared from 20 parts by weight of methyl isopropenyl ketone, 20 parts of 2,4-dichlorostyrene and 60 parts of butadiene employing a recipe and procedure similar to those given in Example 12. The conversion was 100 percent. The latex was free from precoagulated polymer.

Example 14

The following recipe was employed for the preparation of a synthetic rubber latex.

| | Parts by weight |
|---|---|
| Methyl isopropenyl ketone | 25 |
| Para-ethylstyrene | 25 |
| Butadiene | 50 |
| Water | 200 |
| Dresinate 214 | 6 |
| Sodium sulfoxylate formaldehyde | 0.15 |
| Versene | 0.3 |
| Sulfole mercaptan | 0.2 |
| Diisopropylbenzene hydroperoxide | 0.6 |
| KCl | 0.1 |
| KOH | 0.15 |
| $FeCl_3 \cdot 6H_2O$ | 0.15 |

The ingredients were sealed in a pressure resistant glass bottle and agitated and maintained at a temperature of 5° C. for a period of 4 hours. Thereafter, the bottle was opened and its contents removed. The product was a latex free from precoagulated polymer. The conversion was 98.2 percent.

Example 15

A synthetic latex was prepared from 20 parts by weight of methyl isopropenyl ketone 35 parts of alpha-methyl styrene and 45 parts of butadiene employing a recipe and procedure similar to those given in Example 14. The product was a latex free from precoagulated polymer. The conversion was 91.3 percent.

Example 16

A latex was prepared from a mixture of 25 parts by weight of methyl isopropenyl ketone, 25 parts of ar-ethyl chlorostyrene and 50 parts of butadiene employing a recipe and procedure similar to those given in Example 14. The product was free from precoagulated polymer. The conversion was 99.5 percent.

Example 17

A latex was prepared from a mixture of 20 parts by weight of methyl isopropenyl ketone, 35 parts of 3,5-dimethylstyrene and 45 parts of butadiene employing a procedure and recipe similar to that given in Example 14. The product was free from precoagulated polymer. The conversion was 99.4 percent.

Example 18

The following recipe was employed for the preparation of a latex of a copolymer of methyl isopropenyl ketone, ethyl acrylate and butadiene:

| | Parts by weight |
|---|---|
| Methyl isopropenyl ketone | 45 |
| Ethyl acrylate | 15 |
| Butadiene | 40 |
| Water | 200 |
| Dresinate 214 | 7.2 |
| Sodium sulfoxylate formaldehyde | 0.6 |
| Versene | 0.4 |
| Sulfole mercaptan | 0.5 |
| Diisopropylbenzene hydroperoxide (52%) | 1.2 |
| KCl | 0.24 |
| KOH | 0.15 |
| $FeCl_3 \cdot 6H_2O$ | 0.2 |

The mixture was placed in a closed reaction vessel comprising a ¼-inch diameter standard wrought iron pipe coil connected to a gear pump to form a continuous closed passageway, wherein the material was circulated and maintained at a polymerization temperature of 5° C. for a period of 4.5 hours. Thereafter, the latex was removed and filtered. No precoagulated polymer was obtained. The conversion was 98 percent based on the monomers initially used.

Example 19

A latex was prepared from a mixture of 30 parts by weight of methyl isopropenyl ketone, 20 parts of vinylidene chloride and 50 parts of butadiene employing a procedure and recipe similar to those employed in Example 18. The conversion was 85 percent. No precoagulated copolymer was formed.

We claim:

1. In a process for making a rubber-like copolymer in the form of a synthetic latex by polymerizing a mixture of monomeric ingredients comprising a conjugated diolefin and an unsaturated ketone, the method of inhibiting the occurrence of precoagulated polymer which comprises forming and maintaining at a polymerization temperature not higher than 10° C. an emulsion containing (1) a monomeric material comprising from 40 to 80 percent by weight of at least one conjugated diolefin selected from the group consisting of butadiene-1,3 and isoprene, and from 60 to 20 percent by weight of at least one copolymerizable monoethylenically unsaturated organic compound selected from the group consisting of methyl isopropenyl ketone and mixtures of methyl isopropenyl ketone and at least one vinylidene compound selected from the group consisting of acrylonitrile, vinylidene chloride, lower alkyl vinyl ethers containing from 1 to 4 carbon atoms in the alkyl radical, lower alkyl esters of acrylic acid containing from 1 to 4 carbon atoms in the alkyl radical and monovinyl aromatic compounds selected from the group consisting of monovinyl aromatic hydrocarbons of the benzene series and nuclear halogenated monovinyl aromatic hydrocarbons of the benzene series, said monomeric material consisting of at least 5 percent by weight of methyl isopropenyl ketone, and (2) an aqueous phase consisting of water containing at least one anionic emulsifying agent selected from the group consisting of alkali metal salts of fatty acids of tall oil, alkali metal salts of sulfated aliphatic alcohols containing at least 12 carbon atoms in the molecule, and alkali metal salts of disproportionated rosin acid, in amount effective to emulsify the monomeric material, an oxidant-reductant catalyst composition comprising a water-soluble iron salt containing the iron in a condition such that the iron can change its valence state reversibly, an organic hydroperoxide as an oxidant, an organic compound selected from the group consisting of glucose, levulose, sorbose, invert sugar and sodium sulfoxylate formaldehyde, as a reductant, said catalytic composition being effective to polymerize the monomeric material and said emulsion having a pH value between 7 and 12 and containing the monomeric material (1) and the aqueous phase (2) in a ratio of from 10 to 100 parts by weight of the monomeric material per 100 parts of the aqueous phase, and continuing the polymerization at temperatures between 1° and 10° C. until at least 90 percent by weight of the monomeric material is polymerized.

2. In a process for making a rubber-like copolymer in the form of a synthetic latex by polymerizing a mixture of monomeric ingredients comprising a conjugated diolefin and an unsaturated ketone, the method of inhibiting the occurrence of precoagulated polymer which comprises forming and maintaining at a polymerization temperature not higher than 10° C. an emulsion containing (1) a monomeric material comprising from 40 to 80 percent by weight of at least one conjugated diolefin selected from the group consisting of butadiene-1,3 and isoprene and from 60 to 20 percent by weight of at least one copolymerizable monoethylenically unsaturated organic compound selected from the group consisting of methyl isopropenyl ketone and mixtures of methyl isopropenyl ketone and at least one vinylidene compound selected from the group consisting of acrylonitrile, vinylidene chloride, lower alkyl vinyl ethers containing from 1 to 4 carbon atoms in the alkyl radical, lower alkyl esters of acrylic acid containing from 1 to 4 carbon atoms in the alkyl radical and monovinyl aromatic compounds selected from the group consisting of monovinyl aromatic hydrocarbons of the benzene series and nuclear halogenated monovinyl aromatic hydrocarbons of the benzene series, said monomeric material consisting of at least 10 percent by weight of methyl isopropenyl ketone, and (2) an aqueous phase consisting of water containing at least one alkali metal salt of disproportionated rosin acid in amount effective to emulsify the monomeric material, an oxidant-reductant catalyst composition comprising a water-soluble iron salt containing the iron in a condition such that the iron can change its valence state reversibly, and organic hydroperoxide as an oxidant, sodium sulfoxylate formaldehyde as a reductant and a sequestering agent, said catalytic composition being effective to polymerize the monomeric material and said emulsion having a pH value between 7 and 12 and containing the monomeric material (1) and the aqueous phase (2) in a ratio of from 10 to 100 parts by weight of the monomeric material per 100 parts of the aqueous phase, and continuing the polymerization at a temperature between 1° and 10° C. until at least 90 percent by weight of the monomeric material is polymerized.

3. A process as claimed in claim 2, wherein the polymerization is carried out in continuous manner.

4. A process as claimed in claim 2, wherein the polymerization is carried out while having at least a portion of the emulsion in contact with surfaces of a ferrous metal.

5. A process as claimed in claim 2, wherein the polymerization is continued until substantially all of the monomeric material is polymerized.

6. A process as claimed in claim 2, wherein the monomeric material comprises essentially from 40 to 80 percent by weight of butadiene-1,3, from 10 to 50 percent of methyl isopropenyl ketone and from 10 to 40 percent of acrylonitrile per 100 parts by weight of the monomeric material.

7. A process as claimed in claim 6, wherein the polymerization is carried out in continuous manner while having at least a portion of the emulsion in contact with surfaces of a ferrous metal and until substantially all of the monomeric material is polymerized.

8. A process as claimed in claim 2, wherein the monomeric material comprises essentially from 40 to 80 percent by weight of butadiene-1,3, from 10 to 50 percent of methyl isopropenyl ketone and from 10 to 40 percent of styrene per 100 parts by weight of the monomeric material.

9. A process as claimed in claim 8, wherein the polymerization is carried out in continuous manner.

10. A process as claimed in claim 9, wherein the polymerization is carried out while having at least a portion of the emulsion in contact with surfaces of a ferrous metal and until substantially all of the monomeric material is polymerized.

11. A process as claimed in claim 2, wherein the monomeric material comprises a mixture of from 40 to 80 percent by weight of butadiene and from 60 to 20 percent of methyl isopropenyl ketone.

12. A process as claimed in claim 2, wherein the monomeric material comprises a mixture of from 40 to 80 percent by weight of butadiene-1,3, from 10 to 50 percent of methyl isopropenyl ketone and from 10 to 40 percent of a lower alkyl ester of acrylic acid per 100 parts by weight of the monomeric material.

13. A process as claimed in claim 2, wherein the monomeric material comprises a mixture of from 40 to 80 percent by weight of butadiene-1,3, from 10 to 50 percent of methyl isopropenyl ketone and from 10 to 40 percent of a lower alkyl vinyl ether per 100 parts by weight of the monomeric material.

References Cited in the file of this patent

UNITED STATES PATENTS

| | | |
|---|---|---|
| 1,901,354 | Meisenburg | Mar. 14, 1933 |
| 2,385,695 | Dreisbach | Sept. 25, 1945 |
| 2,386,447 | Dreisbach | Oct. 9, 1945 |
| 2,462,354 | Brubaker et al. | Feb. 22, 1949 |
| 2,648,657 | Vandenberg | Aug. 11, 1953 |
| 2,648,658 | Vandenberg | Aug. 11, 1953 |

OTHER REFERENCES

Schildknecht: Polymer Processes, Interscience Pub. Inc. (1956), pages 18, 19, 136, 145 and 170.

Brown et al.: "Rubber World," vol. 132, No. 4, pages 471–477 and 486, July 1955. (Copy in Scientific Library.)